US011655094B2

(12) United States Patent
Eilerts

(10) Patent No.: US 11,655,094 B2
(45) Date of Patent: May 23, 2023

(54) TRANSPORT BOX, IN PARTICULAR FOR PARTIALLY PREPARED MEALS

(71) Applicant: MCHEF GMBH & CO. KG, Bielefeld (DE)

(72) Inventor: Martin Eilerts, Lohne (DE)

(73) Assignee: MCHEF GMBH & CO. KG, Bielefeld (DE)

( * ) Notice: Subject to any disclaimer, the term of this patent is extended or adjusted under 35 U.S.C. 154(b) by 125 days.

(21) Appl. No.: 17/051,952

(22) PCT Filed: May 5, 2019

(86) PCT No.: PCT/EP2019/000136
§ 371 (c)(1),
(2) Date: Oct. 30, 2020

(87) PCT Pub. No.: WO2019/223893
PCT Pub. Date: Nov. 28, 2019

(65) Prior Publication Data
US 2021/0269219 A1    Sep. 2, 2021

(30) Foreign Application Priority Data

May 25, 2018    (DE) .................. 10 2018 004 216

(51) Int. Cl.
*B65D 81/18*    (2006.01)
*B65D 25/04*    (2006.01)
(Continued)

(52) U.S. Cl.
CPC ............. *B65D 81/18* (2013.01); *B65D 25/04* (2013.01); *B65D 43/0216* (2013.01);
(Continued)

(58) Field of Classification Search
CPC ........ B65D 81/18; B65D 25/04; B65D 81/38; F25D 3/08
(Continued)

(56) References Cited

U.S. PATENT DOCUMENTS 8,925,752 B2 *    1/2015    Smith ..................... F25D 3/06
                                                  220/4.27
10,443,918 B2 *    10/2019    Li ........................... F25D 3/08
(Continued)

FOREIGN PATENT DOCUMENTS

EP    0750732 B1    8/1999
EP    2988080 A1    2/2016
(Continued)

*Primary Examiner* — Jeffrey R Allen
(74) *Attorney, Agent, or Firm* — Hayes Soloway PC

(57) ABSTRACT

A transport box, in particular for partially prepared meals and food, includes a lower part having a receiving space limited by lateral walls and at least one base. The receiving space can be sealed by a cover. The cover has a coolant space for receiving a coolant. In addition, the lower part (11) has two receiving spaces. The receiving spaces can be sealed by a respective cover. The covers can be arranged in two cover positions sealing the receiving space. The cover positions differ in terms of a cooling effect that can be achieved by the coolant, such that the transport box offers at least two different options for temperature control via the selection of the cover positions.

16 Claims, 7 Drawing Sheets

(51) Int. Cl.
*B65D 43/02* (2006.01)
*B65D 51/24* (2006.01)
*B65D 51/28* (2006.01)

(52) U.S. Cl.
CPC ........... *B65D 51/242* (2013.01); *B65D 51/28* (2013.01); *B65D 2543/00194* (2013.01); *B65D 2543/00453* (2013.01)

(58) Field of Classification Search
USPC .................................................. 220/592.03
See application file for complete search history.

(56) References Cited

U.S. PATENT DOCUMENTS

2004/0262319 A1* 12/2004 Fisher ..................... F25D 3/08
    220/528
2006/0163263 A1* 7/2006 Helline .................... F25D 3/08
    220/592.03

FOREIGN PATENT DOCUMENTS

EP    3051238 B1    8/2016
EP    3199894 A1    8/2017

* cited by examiner

TRANSPORT BOX, IN PARTICULAR FOR PARTIALLY PREPARED MEALS

CROSS-REFERENCE TO RELATED APPLICATIONS AND PRIORITY

This patent application claims priority from PCT Patent Application No. PCT/EP2019/000136 filed May 2, 2019, which claims priority from German Patent Application No. 10 018 004 216.3 filed May 25, 2018. Each of these patent applications are herein incorporated by reference in its/their entirety.

The present invention relates to a transport box, in particular for partially prepared meals and food, having at least one receiving space limited by lateral walls and at least one base, it being possible to seal the receiving space by at least one cover and the cover having at least one coolant space for receiving at least one coolant.

Different transport boxes have been disclosed in the state of the art, which enable cooling of food to be transported. Dry ice is frequently used in such transport boxes, in order to be able to keep the food at temperatures below the freezing point of water during transport. A continuous and reliable cooling to a freezing level cannot be ensured regularly by means of such boxes. A further disadvantage is that different types of food cannot be stored under 2° C., in order to prevent freezing.

The objective of the present invention is therefore to provide a transport box, which can be used in an especially flexible manner. This objective is achieved by means of a transport box with the features of claim 1. Preferred improvements of the invention are the object of the dependent claims. Further advantages and features of the present invention result from the general description and the description of the embodiments.

The transport box according to the invention serves in particular to transport partially prepared meals and food. The transport box comprises at least one lower part having at least one receiving space limited by lateral walls and at least one base. The receiving space can be sealed by at least one cover. The cover has at least one coolant space for receiving at least one coolant. In addition, the lower part has at least two receiving spaces. The receiving spaces can be sealed by at least one respective cover. Each cover can be arranged in at least two cover positions sealing the receiving space. In addition, the cover positions differ in terms of a cooling effect that can be achieved by means of the coolant. The transport box thereby offers at least two and preferably four different options for temperature control via the selection of the cover positions.

The transport box according to the invention offers many advantages. A considerable advantage is offered by the two receiving spaces, which can be sealed respectively in two different cover positions. Since a different cooling effect can be achieved by means of each cover position, a total of four different combinations of cooled receiving spaces result for the transport box according to the invention. Thus, the transport box according to the invention can be used in an especially flexible manner and for a great deal of different food.

The transport box comprises in particular two separate covers. The covers can be placed in particular on the lower part. The covers are preferably configured similarly and in particular identically. In particular, the covers are equipped likewise with a coolant. The covers can be arranged both in the first or in the second cover position or in different cover positions.

Preferably, in the first cover position, the temperature of the receiving space can be controlled by means of at least one coolant received in the coolant space to a freezing temperature smaller than 0° C. and in particular smaller than −12° C. In an especially preferred manner, in the first cover position, the temperature of the receiving space can be controlled by means of the coolant to a freezing temperature between −12° C. and −22° C. or lower. In particular, the freezing temperature is less than −18° C. It is also possible for the freezing temperature to be less than −16° C. or also less than −20° C. In particular, in the first cover position, the receiving space is configured as a freezing space. Such a configuration has the advantage that, by means of the first cover position, sensible meals can be frozen and consequently transported in an especially durable manner.

Preferably, in the second cover position, the temperature of the receiving space can be controlled by means of at least one coolant received in the coolant space to a keep-fresh temperature above 0° C. and in particular between 0° C. and 6° C. In an especially preferred manner, in the second cover position, the temperature of the receiving space can be controlled by means of the coolant to a keep-fresh temperature between 2° C. and 6° C. and in particular between 2° C. and 8° C. Such configurations have the advantage that, in the second cover position, meals which can be cooled but not frozen, can be transported in a safe and reliable manner. In the second cover position, the receiving space is configured in particular as a cooling space or fresh space.

In an especially preferred manner, between the receiving spaces there is arranged at least one shared lateral wall. The lateral wall has in particular a thickness of more than 70 mm and preferably of more than 74 mm. In particular, the thickness is between 70 mm and 100 mm. In this respect, the data of the thickness relates in particular to a weakest or thinnest point of the lateral wall. By such a lateral wall, an undesirable heat exchange between the keep-fresh region and the freezing region is reliably avoided. A larger or smaller thickness is also possible.

In particular, the receiving spaces are configured in a mirror-symmetrical manner. In particular, there is a mirror axis or mirror plane between the two receiving spaces. In particular, the mirror axis or mirror plane is on the common lateral wall. Such a configuration enables an especially uncomplicated manufacturing of the transport box.

Preferably, the covers have at least one respective recessed grip. The recessed grip is configured in particular as a cutout at one corner of the cover. This enables an especially comfortable and simple opening of the transport box. In particular, the cutout is provided at one corner, which in a normal arrangement is directed to the lower part. At least two recessed grips are preferably provided at two opposite corners of the cover.

It is possible and preferable for at least one deepened and/or elevated sealing surface for applying a sealing to be provided. The sealing surface is provided in particular by means of at least one partial section of the lower part and by means of at least one partial section of a cover. In particular, for the covers there is provided at least one respective partial section. In particular, the partial sections complement one another to form a sealing surface. In particular, a sealing can be affixed onto the sealing surface. Thus, in the event of an intact sealing, it can be assumed that the food has been transported with an envisaged temperature control. This is valid for a transport duration of 24 hours.

In particular, in a second cover position, the cover is rotated about a vertical axis with respect to a first cover position. In particular, the cover is rotated 180°. This enables a simple and comfortable adjustment of the desired temperature control. Other rotation angles are also possible.

It is also possible, in a second cover position, for the cover to be turned about a horizontal axis with respect to a first cover position. In addition, the lower side and the upper side of the cover are in particular changed.

Preferably, at least one outlet opening for discharging the coolant from the receiving space is associated to the receiving space. In an especially preferred manner, at least two or three or also four or more outlet openings are provided. The outlet opening is arranged in particular in the lateral wall. Preferably, the outlet opening is arranged in that lateral wall, which is equipped with an outlet groove.

The receiving spaces are configured in particular in single piece with the lower part. The receiving spaces can in particular be used independently from one another and are in particular not connected in terms of flow with one another. The receiving spaces are in particular isolated from one another.

A flow of the coolant is understood in the context of the present invention in particular as a flow of cold air or a mixture of a gaseous coolant and air within the receiving space or in the channel unit.

The coolant which can be received in the coolant space is in particular dry ice or frozen carbon dioxide. It is possible for the transport box to comprise at least one coolant and preferably dry ice. Dry ice enables the implementation of the temperature ranges described above in an especially advantageous manner. In particular, the dry ice is used in the form of pellets. The use of dry ice in blocks or of dry ice discs is also possible. In particular, the coolant is in a solid or frozen state in the coolant space. When exiting the coolant space or when flowing through the channel unit, the coolant is in particular substantially in a gaseous state.

In particular, the coolant space is suitable and configured for receiving dry ice. In particular, at least 3 kg of dry ice, in particular in the form of 16 mm dry ice pellets, can be stored there. For example, for implementing the freezing temperature described above in colder environmental conditions and in particular in winter, 2 kg of dry ice pellets are used. In warmer environmental conditions or in summer, 3 kg of dry ice are used, for example. In addition, the transport box is suitable and configured for implementing the keep-fresh temperature using approximately 1.2 kg of dry ice pellets in summer and 0.8 kg in winter.

The coolant space preferably has a reception volume between 4 l and 7 l. In particular, the coolant space has a reception volume between 5 and 6 l. For example, the receiving space has a reception volume of 5.5 l. Depending on the dimension of the receiving space, larger or smaller volumes are also possible.

The receiving space has in particular a volume between 8 and 30 l, preferably a volume between 14 and 20 l. In particular, the receiving space has a volume between 16 l and 18 l. The volume, due to the inner configuration of the receiving space, can fluctuate up to one liter or more. Such a receiving space can be held in particular by means of the above described coolant in an especially advantageous manner at the freezing temperature or the keep-fresh temperature. Larger or smaller volumes of the receiving space are also possible. Preferably, the amount and type of the coolant are adapted to the volume of the receiving space and/or the desired freezing temperature or keep-fresh temperature.

The freezing temperature and/or the keep-fresh temperature can be provided preferably for at least 8 hours. The freezing temperature and/or the keep-fresh temperature are provided preferably for at least 12 hours and in an especially preferable manner for at least 16 hours. It is also possible for the freezing temperature and/or the keep-fresh temperature to be provided for at least 20 hours or 22 hours or also for 24 hours or more.

The transport box is made in particular of a particle foam material and, for example, of expanded polypropylene (EPP) or at least another suitable material. In particular, the walls limiting the receiving space and preferably also the cover are made of such a material. In particular, the transport box is made of an insulating material.

The transport box is configured in particular for a passive cooling. In particular, a passive cooling of the receiving space is provided. In particular, a passive flow of the coolant through the channel unit is provided. In particular, the flow of the coolant takes place due to temperature differences in the receiving space or in the cover. In the second cover position or at the keep-fresh temperature, the temperature control takes place preferably via thermal radiation and/or thermal conduction and in particular not via heat flow or convection. In the first cover position or at the freezing temperature, the temperature control also takes place preferably via heat flow or convection.

In the receiving space there is arranged in particular at least one channel unit for guiding the coolant. The channel unit is in particular suitable and configured for guiding the coolant in such a way that the temperature of the receiving space, in a first cover position, can be controlled to the freezing temperature and, in a second cover position, can be controlled to a keep-fresh temperature above 0° C.

The channel unit preferably has at least one inlet groove for receiving an inflowing coolant. Preferably, the inlet groove is arranged in at least one of the lateral walls. This offers an especially advantageous guidance of the coolant. The inlet groove is in particular in flow connection with the receiving space. The inlet groove, in the first cover position, is in particular in flow connection with the coolant space. The inlet groove and/or the further groove are configured in a peripherally open manner in particular at least in sections and preferably over their entire length.

Preferably, the inlet groove is arranged only on a lateral wall. In particular, the inlet groove or two or a plurality of inlet grooves are not arranged on opposite lateral walls. However, it is also possible for at least one respective inlet groove to be arranged on two or more lateral walls. By means of such an arrangement of the inlet groove, the channel unit can be sealed or opened in an especially uncomplicated manner, for example by turning the cover.

The lateral wall section is provided in particular by an upper side or front side of the lateral wall. In a cover position, the cover rests in particular at least in sections on the lateral wall section.

It is preferable for at least one further groove of the channel unit and preferably at least two or a plurality of further grooves to be arranged in the lateral walls and/or in the base. Preferably, the coolant can flow through the inlet groove and/or the further grooves at least in sections along at least two lateral walls and/or at least in sections along the base. In particular, the coolant can flow through the inlet groove and the further grooves along at least two lateral walls and along the base. The item to be transported is thereby flushed in an especially extensive manner, such that an especial good cooling effect is achieved.

The further grooves comprise in particular at least one outlet groove and/or at least one base groove. The further grooves comprise in particular at least two and preferably a plurality of outlet grooves and/or base grooves. In particular, at least one outlet groove is arranged on at least one of the lateral walls. It is preferable for the outlet groove to run from below, preferably from the base, upwards, preferably up to an upper side of the lateral wall. Preferably, the outlet groove runs from the base up to an upper side of the lateral wall and in particular over the entire lateral wall. In particular, at least one outlet opening, through which the coolant can leave the receiving space, is associated to the lateral wall with the outlet groove.

In particular, at least one base groove is arranged in the base. In particular, the base groove extends from a lateral wall to another lateral wall and preferably to an opposite lateral wall. In an especially preferred manner, the base groove connects the inlet groove and the outlet groove with one another.

In an advantageous configuration, the further grooves are provided by at least four outlet grooves and at least eight base grooves. Preferably, some of the base grooves meet an outlet groove and the other base grooves meet a lateral wall. For example, half of the base grooves meet an outlet groove and the other half meet a lateral wall. Such a configuration offers an especially advantageous guidance of the coolant. It is also possible for all the base grooves to meet at least one outlet groove. In particular, the further grooves are provided by at least one outlet groove and/or at least one base groove. It is also possible for at least two outlet grooves and/or at least two base grooves to be provided. It is possible for five or six or more outlet grooves to be provided. It is also possible for eight or nine or ten or more base grooves to be provided.

The inlet groove meets in particular at least two base grooves. For that purpose, the inlet groove is preferably configured with such a width, that it covers at least two base grooves. By means of such a configuration, an especially favorable convection in the receiving space is achieved. It is possible for a plurality of inlet grooves to be provided. In such case, preferably all the inlet grooves meet at least one base groove and in particular at least two respective base grooves.

The inlet groove and the outlet groove are arranged in particular on opposite lateral walls. It is preferable, in the event of a rotation of the cover about 180°, for the passage opening to be moved from the inlet groove to a lateral wall section lying beside the outlet groove or to a lateral wall section lying between at least two outlet grooves. Thus, the connection of the channel unit or of the inlet groove with the coolant space is sealed by the lateral wall section with a corresponding rotation of the cover.

In a preferred configuration, a plurality of inlet grooves and outlet grooves and base grooves are provided. The inlet grooves and the base grooves are provided in particular only on a respective lateral wall. However, it is also possible for the inlet grooves and outlet grooves to be distributed over two or more lateral walls. In particular, the inlet grooves and the outlet grooves are provided on opposite lateral walls. In an especially preferred manner, at least two base grooves and/or outlet grooves are associated to an inlet groove.

The further grooves preferably have at least partially a depth and/or width of at least 6 mm. Preferably, the further grooves have at least partially a cross-sectional area of at least 36 mm$^2$. In particular, the further grooves have at least one depth and/or width of at least 7 mm and/or a cross-sectional area of at least 49 mm$^2$. In an especially preferred manner, the further grooves have at least partially a depth and/or a width of at least 10 mm. It was possible to show that due to such grooves an especially favorable convection or heat flow is produced, such that the food is optimally flushed by the coolant. Smaller or larger grooves are also possible.

In particular, the further grooves have the above described dimensions over more than half of their length and preferably over their entire length.

In particular, the further grooves respectively have a smaller cross-sectional area than a single inlet groove. In particular, the further groove is configured in a narrower and/or flatter manner than the inlet groove.

In particular, the inlet groove runs from an upper side of the lateral wall towards the base and preferably up to the base. In particular, the inlet groove runs over the entire lateral wall. The item to be transported can thereby by flushed in an especially favorable manner.

The inlet groove preferably has a width of at least 40 mm. It is also possible for the channel unit to have a plurality of inlet grooves and for at least part of the inlet grooves to be configured respectively wider than the wall sections lying between same. Preferably, the width of the inlet groove is at least 50 mm. In particular, the width of the inlet groove is less than 100 mm. Therefore, a larger or smaller width can also be provided. Preferably, the depth of the inlet groove is at least 6 mm and preferably at least 7 mm and in an especially preferable manner at least 10 mm. A larger or smaller depth is also possible. In experiments, inlet grooves designed in such manner have proven to be especially advantageous for the envisaged temperature ranges.

The wall sections lying between the inlet grooves are configured in particular as ridges. By means of such ridges, the item to be transported can be separated from the inlet grooves in an especially advantageous manner.

In an especially preferred configuration, the channel unit comprises a plurality of inlet grooves. In addition, the inlet grooves are arranged in particular only on a lateral wall of the receiving space. Thus, an advantageous flushing of the food and at the same time an especially uncomplicated implementation of the cover positions can be achieved. On the one lateral wall there are provided in particular at least two and preferably at least three and in an especially preferable manner at least four inlet grooves. The inlet grooves can also be arranged on at least two lateral walls.

In particular, the channel unit comprises at least two inlet grooves and preferably at least three or at least four inlet grooves and in an especially preferable manner at least five inlet grooves. Six or seven or more inlet grooves are also possible. In connection with the above described configurations of the transport box, five inlet grooves have proven to be especially advantageous for achieving an as favorable as possible coolant flow in the receiving space. The above-mentioned numbers relate in particular to an arrangement of the inlet grooves on one lateral wall. In the event of an arrangement of the inlet grooves on two or more lateral walls, correspondingly more inlet grooves are in particular provided.

In particular, each inlet groove meets at least one base groove and preferably at least two base grooves. It is possible for only part of the base grooves to meet an outlet groove. In particular, only some of the base grooves meet an outlet groove. In particular, the other base grooves directly meet a lateral wall. It is also possible for all the base grooves to meet one or several outlet grooves.

The receiving space serves preferably for receiving at least one and in an especially preferable manner at least two or more secondary packagings of meals. In this respect, the meals can be arranged on dish units. The secondary packagings can also contain beverages or beverage bottles. By means of such secondary packagings, the receiving space can be optimally filled, and the flow properties of the grooves be advantageously used. It is possible for the transport box to comprise at least one secondary packaging which, preferably alone or in combination with further secondary packagings, substantially fills the receiving space except for the grooves and/or recessed grips. In particular, the secondary packagings are adapted to the length and/or width and/or height of the receiving space. The secondary packaging is configured in particular in a rectangular- or cube-shaped manner.

The channel unit and the coolant space can be connected in particular via at least one flow connection for the coolant. Preferably, in the first cover position, the flow connection is at least partially opened and in particular opened in a further degree than in the second cover position. Preferably, in the second cover position, the flow connection is closed or opened in lesser degree than in the first cover position. Thus, via the selection of the cover position, it is possible to adjust a release or prevention of the coolant flow, in order to thereby control the temperature of the receiving space in a different manner.

In an especially preferred configuration, the flow connection for the coolant comprises at least one through-opening arranged in the cover or is configured as such. It is preferable for the through-opening to be arranged, in the first cover position, at least partially overlapping the inlet groove and in particular with the inlet groove being overlapped in a further degree than in the second cover position. It is also preferred for the through-opening, in the second cover position, to be at least partially sealed by at least one lateral wall section of the receiving space and in particular with the lateral wall section being overlapped in a further degree than in the first cover position. In particular, in the second cover position, the through-opening is completely sealed by the lateral wall section. It is possible for, the entire through-opening, in the first cover position, to be arranged overlapping the inlet groove. It is also possible for only part of the through-opening, in the first cover position, to be arranged overlapping the inlet groove.

Such a configuration offers many advantages and enables an especially uncomplicated and at the same time very reliable release or prevention of the coolant flow depending on the cover position. The inlet groove also offers many advantages. Thus, for example, the flow of the coolant also not interrupted, when the receiving space is filled with item to be transported, welches rests directly or closely on the lateral walls.

The through-opening extends in particular between the coolant space and a lower side of the cover. Preferably, the through-opening is arranged only along a lateral edge of the lower side of the cover. The through-opening can also extend along two or more lateral edges. In this case, in particular two or a plurality of through-openings are provided.

Further advantages and features of the present invention result from the embodiments, which will be explained below with respect to the attached drawings.

Figure 1:
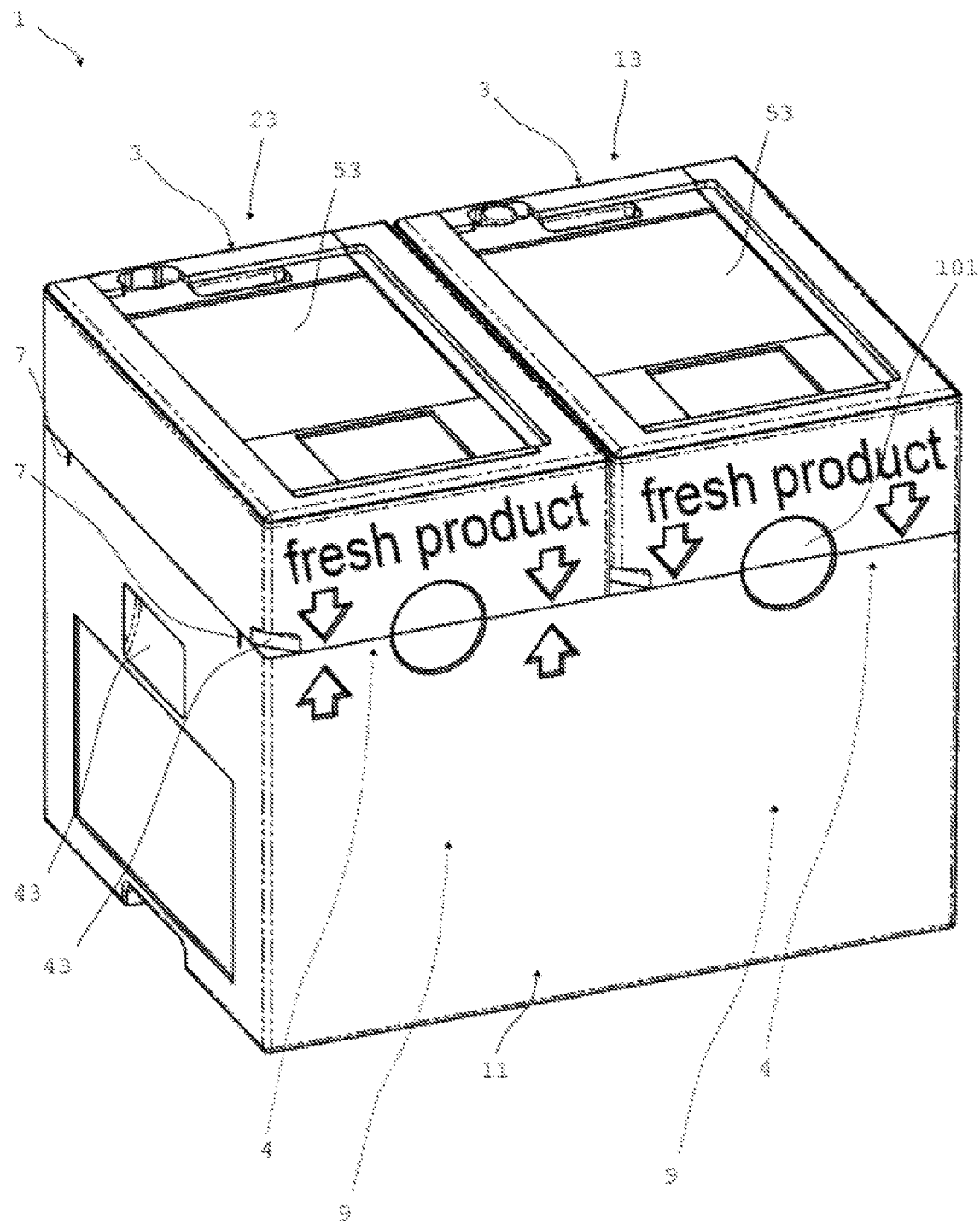
FIG. 1 shows a perspective view obliquely from above of a merely schematic depiction of a transport box according to the invention.
Figure 2:
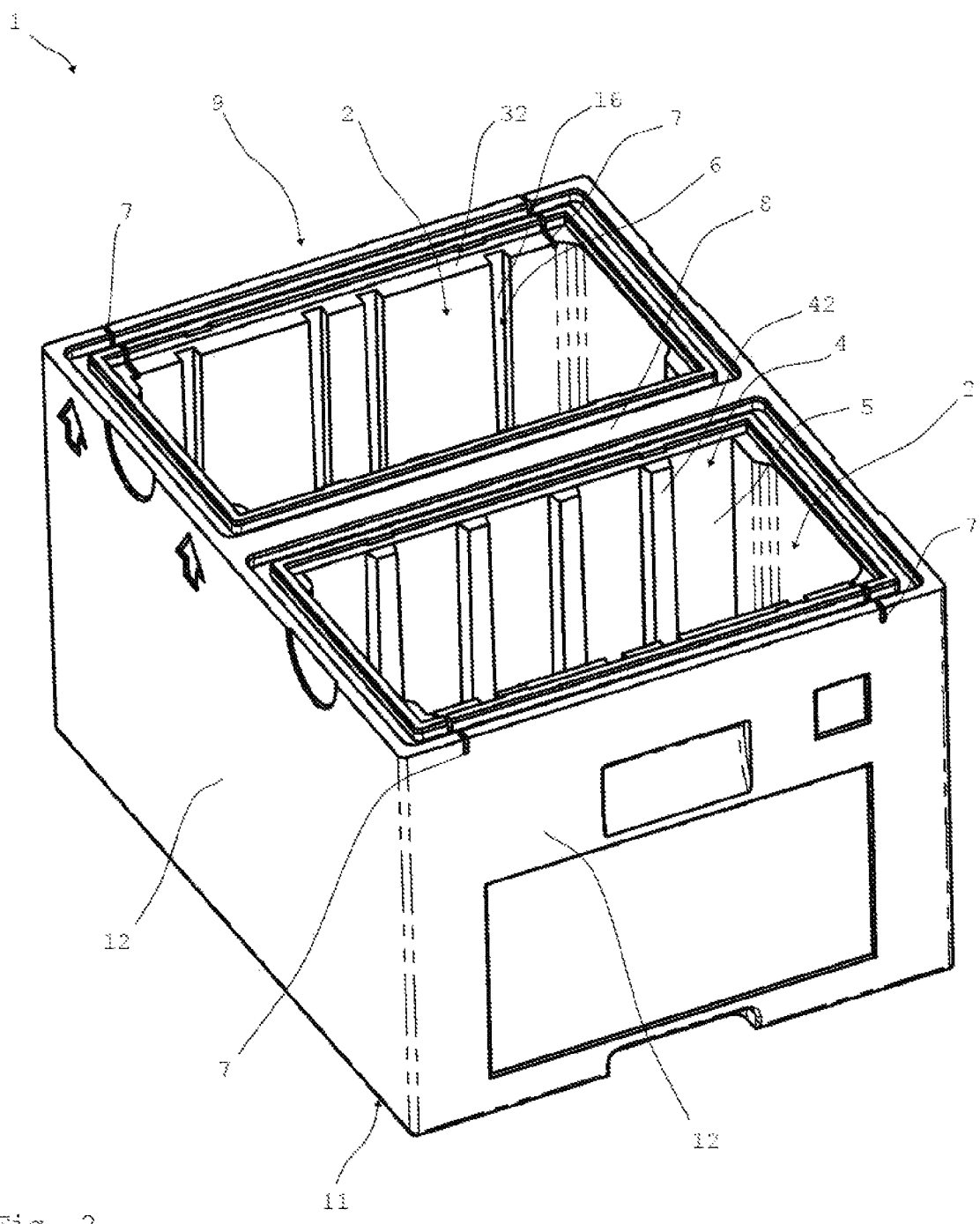
FIG. 2 shows the transport box with a cover being removed.
Figure 3:
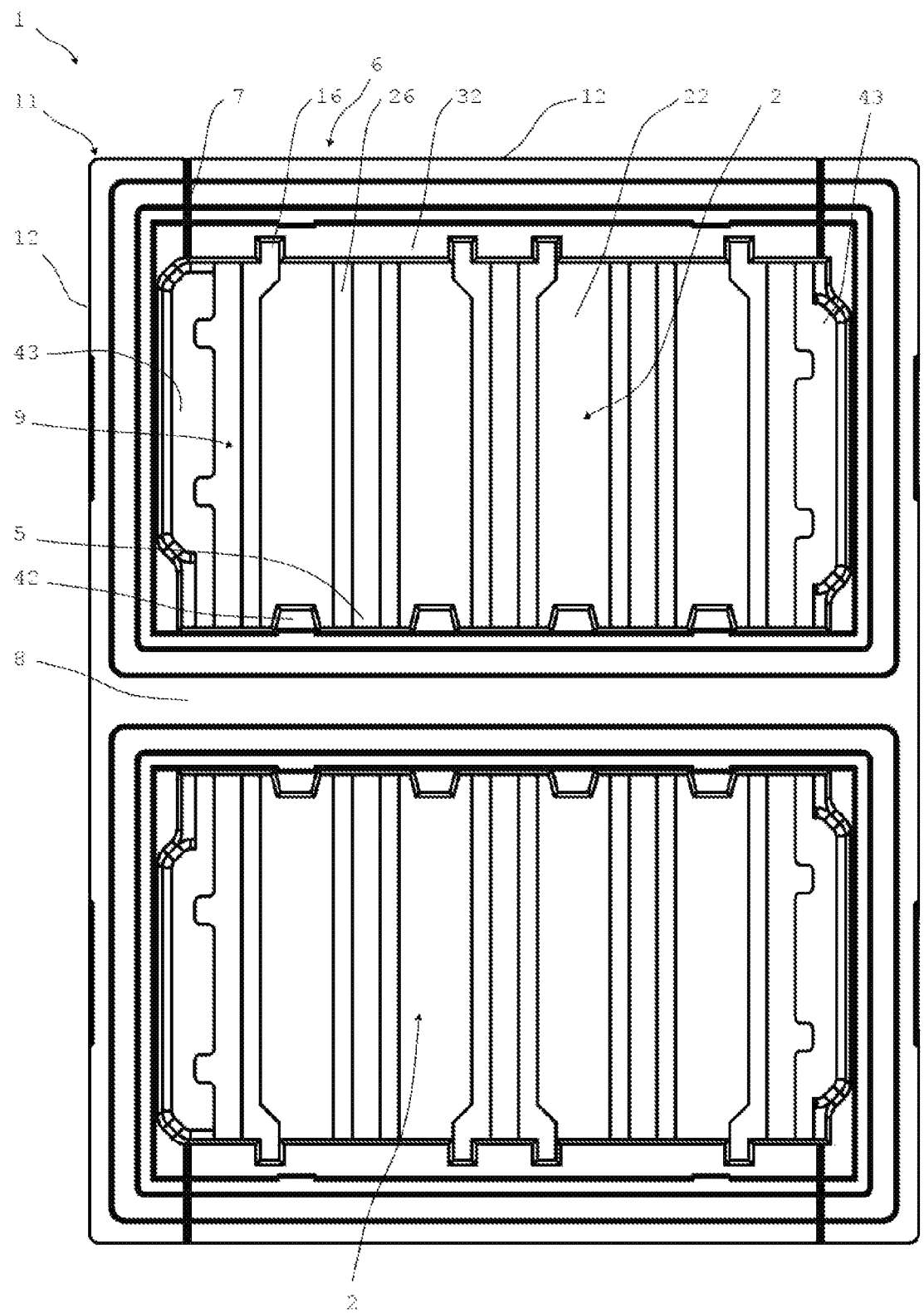
FIG. 3 shows a plan view of the transport box with the cover being removed.
Figure 4:
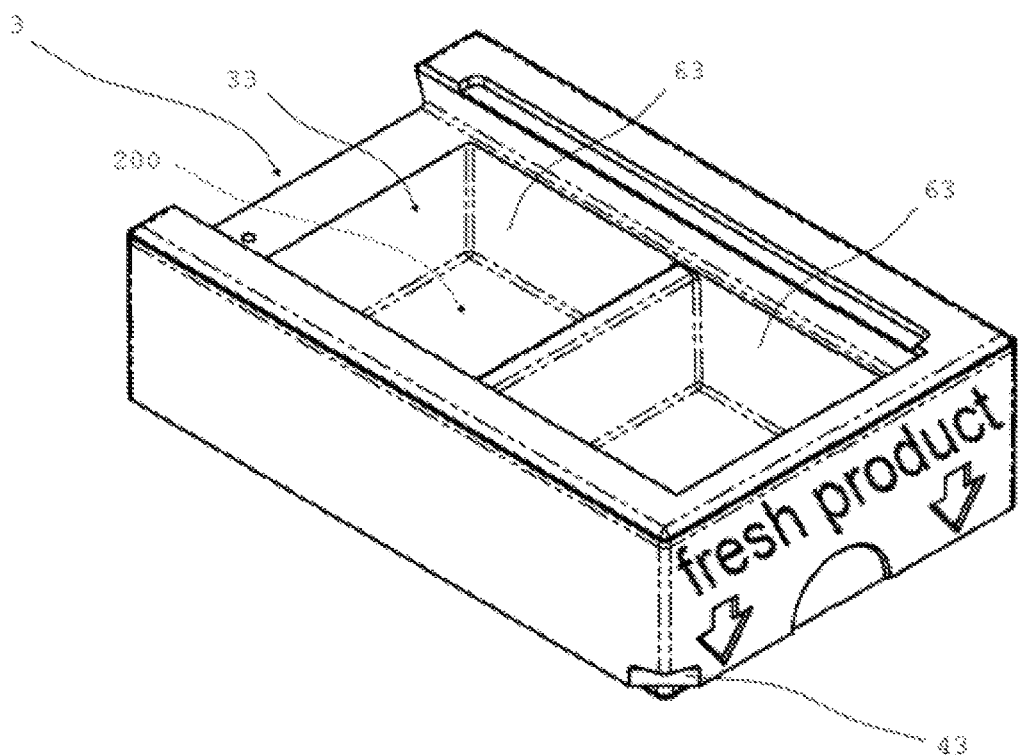
FIG. 4 shows a perspective view obliquely from above of the cover.

FIG. 1 shows a transport box 1 according to the invention comprising a lower part 11 and a cover 3 arranged on the lower part 11. The lower part 11 provides here two receiving spaces 2. In addition, each receiving space 2 can be sealed by a separate cover 3.

The lower part 11 has lateral walls 12 and a base 22, which limit the receiving spaces 2. Between the receiving spaces 2 there is arranged a lateral wall 8 shared by both receiving spaces 2.

The transport box 1 will now be described in further detail below with respect to FIGS. 1 to 8. The lower part 11 is shown in further detail in FIGS. 2 and 3. Depictions of the cover 3 can be found in FIGS. 4 to 6.

The covers 3 can be placed here in two different cover positions 13, 23 on the lower part 11. The cover positions are shown in further detail in FIGS. 7 and 8.

In the cover 3 there is a coolant space 33 for receiving a coolant 200, which is not depicted here in further detail, for example dry ice or frozen carbon dioxide. In particular, 16 mm dry ice pellets are used. When the dry ice sublimates, the gaseous carbon dioxide can enter the receiving space 2 through a flow connection 4, which will be described in further detail below. In the receiving space 2, the coolant 200 is guided in a directed manner by means of a channel unit 9, in order to achieve an optimal heat flow for the desired temperature control.

The coolant space 33 comprises here two coolant regions 63, between which a dividing wall extends. In order to seal the coolant space 33 there is provided a cover 53, which is configured here as an insertion cover. The cover 53 is inserted in lateral grooves of the cover 3 for sealing thereof. Preferably, the cover 53 is additionally locked, such that an accidental opening of the coolant space 33 is prevented.

Between the covers 3 and the receiving spaces 2 there is provided here a respective openable or sealable flow connection 4. Through the flow connection 4, the dry ice passing onto the gas phase can leave the coolant space 33 and enter the receiving space 2. The flow connections 4 are provided here by means of through-openings 14. In the covers 3 shown here, there are provided four respective through-openings 14 configured as elongated holes 24. In addition, for each cover 3 there are provided two respective longer elongated holes 24 and two respective shorter elongated holes 24.

Depending on the cover position 13, 23, the temperature of the receiving spaces 2 can be controlled by the coolant 200 received in the cover 3 in a different manner.

In the first cover position 13, the flow connection 4 is released, such that the coolant 200 can flow into the receiving space 2. For that purpose, the receiving spaces 2 comprise here a respective channel unit 9 with five respective inlet grooves 5. The inlet grooves 5 are incorporated here in the common lateral wall 8. The elongated holes 24 are arranged, in the first cover position 13, overlapping the inlet grooves 5. The overlapping arrangement can be seen in an especially good manner in FIG. 7. It can be envisaged for an inlet groove 5 to not overlap with the elongated holes 24.

For the second cover position 23, the cover 3 is rotated 180° from the first cover position 13. In this cover position 23, the elongated holes 24 do not overlap anymore the inlet grooves 5 and the flow connection 4 is sealed. This arrangement can be seen in an especially good manner in FIG. 8.

In the lateral wall 12, which is opposite to the lateral wall 8 with the inlet grooves 5, there are provided here lateral wall sections 32. In the second cover position 23, the elongated holes 24 lie over the lateral wall sections 32 and are sealed therewith.

So that the coolant 200 flowing into the inlet grooves 5 can be distributed in an especially uniform and directed manner in the receiving space 2, further grooves 6 are provided. Base grooves 26 arranged in the base 22 are provided here as further grooves 6. Furthermore, in the lateral wall 12, which is opposite to the inlet grooves 5, there are incorporated grooves 6 configured as outlet grooves 16. Thus, the coolant 200 or the cold air can flow through the inlet grooves 5 downwards and from there through the base 22 to the opposite lateral wall 12. From there, the coolant 200 or the cold air ascends again upwards and can exit to the surrounding of the transport box 1 through outlet openings 7. By means of the grooves 5, 6 shown here, an especially advantageous guidance of the coolant 200 or the cold air is achieved.

For each receiving space 2 there are provided here two respective outlet openings 7. The outlet openings 7 are arranged here in the lower part 11. For example, the outlet openings 7 are arranged as slot-like depressions on an upper side of that lateral wall 12, in which the outlet grooves are also arranged. Thus, the coolant 200 can exit between the lower part 11 and the cover 3.

With the transport box 1 shown here, the temperature of the receiving space 2, in the first cover position 13, is controlled by means of the coolant 200 to a freezing temperature of less than minus 12° and, for example, to minus 18° or less. For that purpose, for example, 2 to 3 kg of dry ice pellets are inserted in the cover 3, depending on the outer temperatures.

By means of the configuration and arrangement shown here of the inlet grooves 5 and the further grooves 6, the freezing temperature can be adjusted reliably with such an amount of dry ice. For example, a temperature control of the receiving space 2 over at least 24 hours or even up to 30 hours is thus possible. This is a requirement, which must be necessarily complied with for usual transport routes and conditions.

In order to be able to flush the transported food in an especially good manner with the coolant 200 or with cold air and reliably comply with the freezing temperature, the inlet grooves 5 and the further grooves 6 are adapted here to one another in a directed manner. For example, the further grooves 6 have a depth of 10 mm and a width of 10 mm. This has proven to be especially advantageous for an optimal convection.

Furthermore, the inlet grooves 5 are configured here with a corresponding width. For example, the inlet grooves 5 have a width of more than 40 mm. Furthermore, the inlet grooves 5 are configured here wider than the wall sections 42 lying between same. Thus, an especially good convection is achieved. Furthermore, the wall sections 42 hold the item to be transported at a distance, such that the flow routes are not blocked. This is especially advantageous, when the food is transported in rectangular-shaped or cube-shaped secondary packagings.

By means of sealing the flow connection 4 as shown here, in the second cover position 23, the temperature of the receiving space 2 is controlled by means of the coolant 200 to a keep-fresh temperature between 0° C. and 6° C. For that purpose, only an amount of 0.8 kg to 1.2 kg of dry ice pellets, depending on the outer temperature, must be filled into the coolant space. By means of sealing the elongated holes 24 with the respective lateral wall sections 32, no more coolant 200 gets into the receiving space 2. The temperature control takes place in the second cover position 23 consequently not anymore by means of convection or heat flow, but only by means of thermal radiation and thermal conduction.

By means of the two receiving spaces 2 in the transport box 1, four options for temperature control consequently result. Both receiving spaces 2 can be adjusted to the keep-fresh temperature or both receiving spaces 2 can be adjusted to the freezing temperature. Or the left receiving space 2 is adjusted to the keep-fresh temperature and the right receiving space 2 is adjusted to the freezing temperature, or vice versa.

For reliably complying with the keep-fresh temperature, the covers 3 are equipped here with a respective base with a thickness of 15 mm. The keep-fresh temperature can thereby be complied with in a safe manner with the above described amount of dry ice, reliably over at least 12 hours or also up to 24 hours or more.

An especial advantage of the transport box 1 presented here is that the temperature of the two receiving spaces 2 can be controlled differently in a simple and uncomplicated manner. For example, in the first cover position 13, a cover 3 is placed, such that the freezing temperature is adjusted. If, in the second cover position 23, the other cover 3 is placed, the other receiving space 2 is adjusted to the keep-fresh temperature. Thus, with the transport box 1 it is possible to transport both frozen food and frost-sensitive food. In order to avoid a heat transfer between the receiving spaces 2, the common lateral wall 8 is here at least 70 mm and, for example, 74 mm thick.

In order to simplify the removal of the cover 3, recessed grips 43 are provided here. For that purpose, cutouts are arranged here on two opposite corners of the cover 3. The fingers can thereby be placed in an especially good manner in the recessed grip 43, in order to lift the cover 3 from the lower part 11.

In order to simplify carrying the transport box 1, the lower part 11 is equipped with two opposite recessed grips 43. Within the receiving spaces 2 there are also provided recessed grips 43. Thus, rectangular-shaped or cube-shaped secondary packagings and, for example, boxes can be removed in an especially good manner from the receiving space 2. The recessed grips 43 in the receiving space 2 are arranged here on that lateral walls 12, which have no grooves 5, 6.

Figure 5:
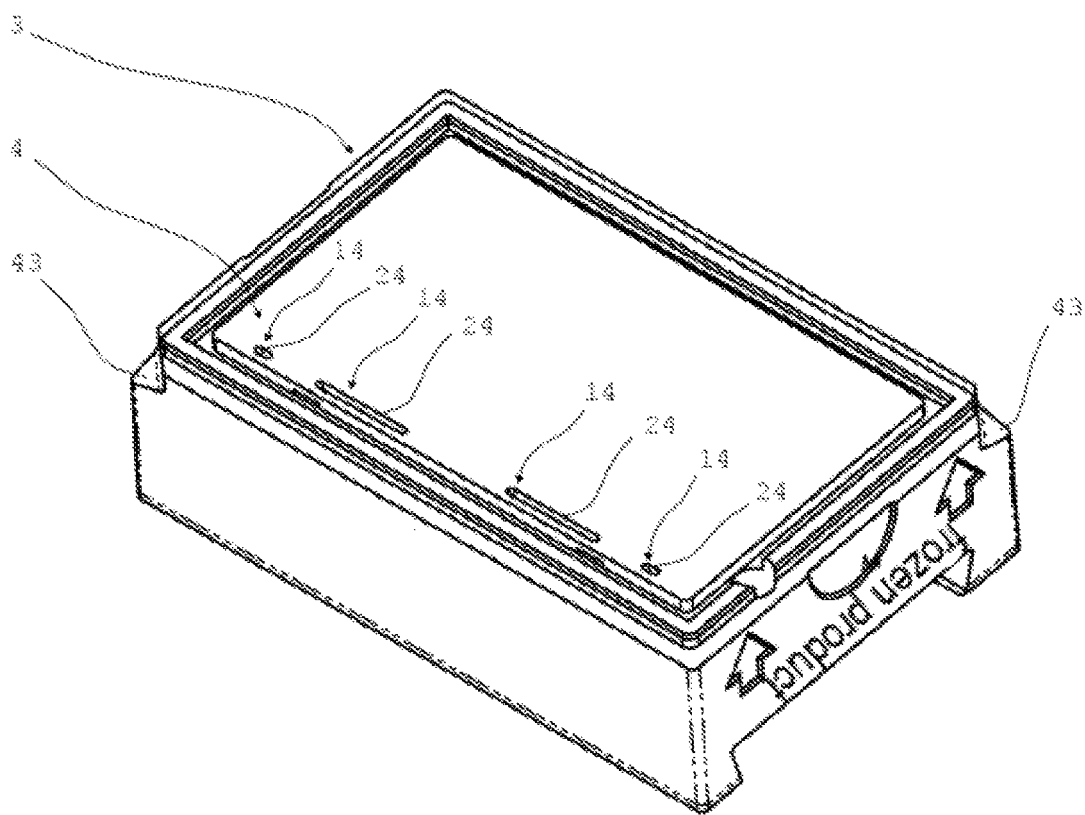
FIG. 5 shows a perspective view obliquely from above of the lower side of the cover.
Figure 6:
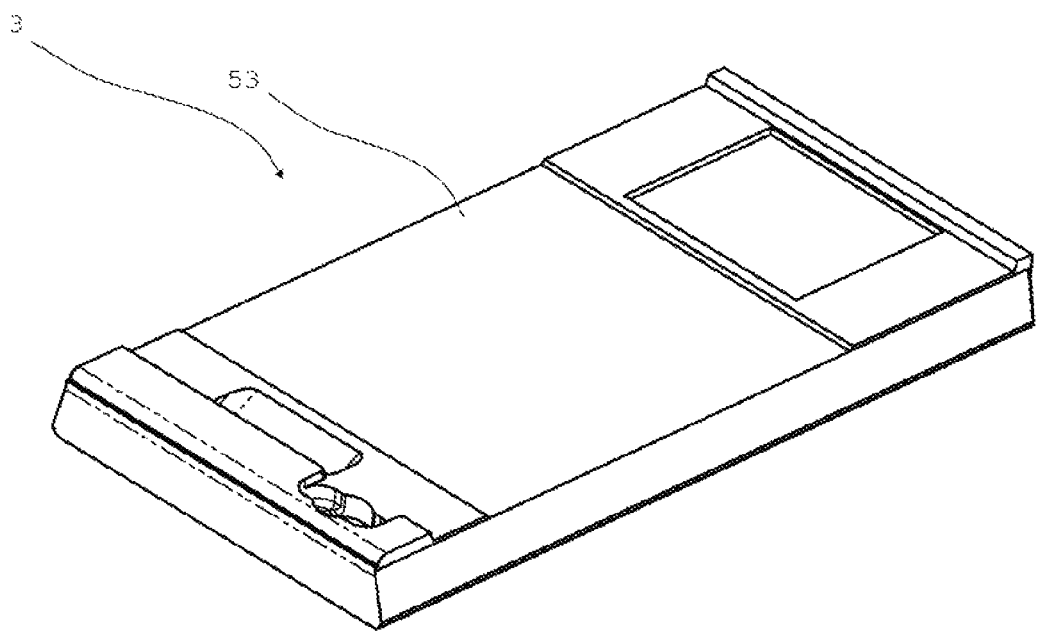
FIG. 6 shows a cover for a coolant space of the cover.
Figure 7:
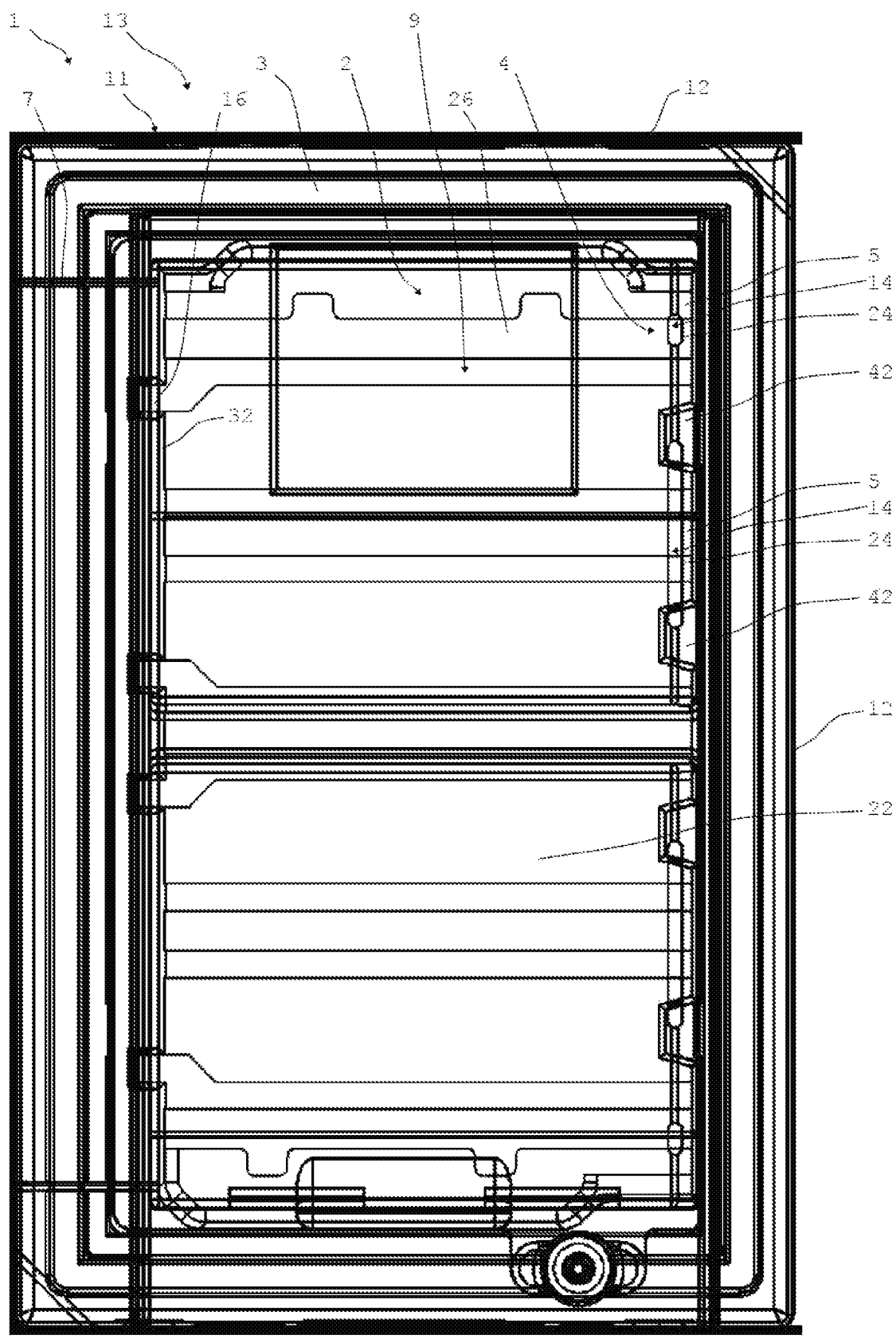
FIG. 7 shows a plan view of a partially transparent depiction of the transport box in a first cover position.
Figure 8:
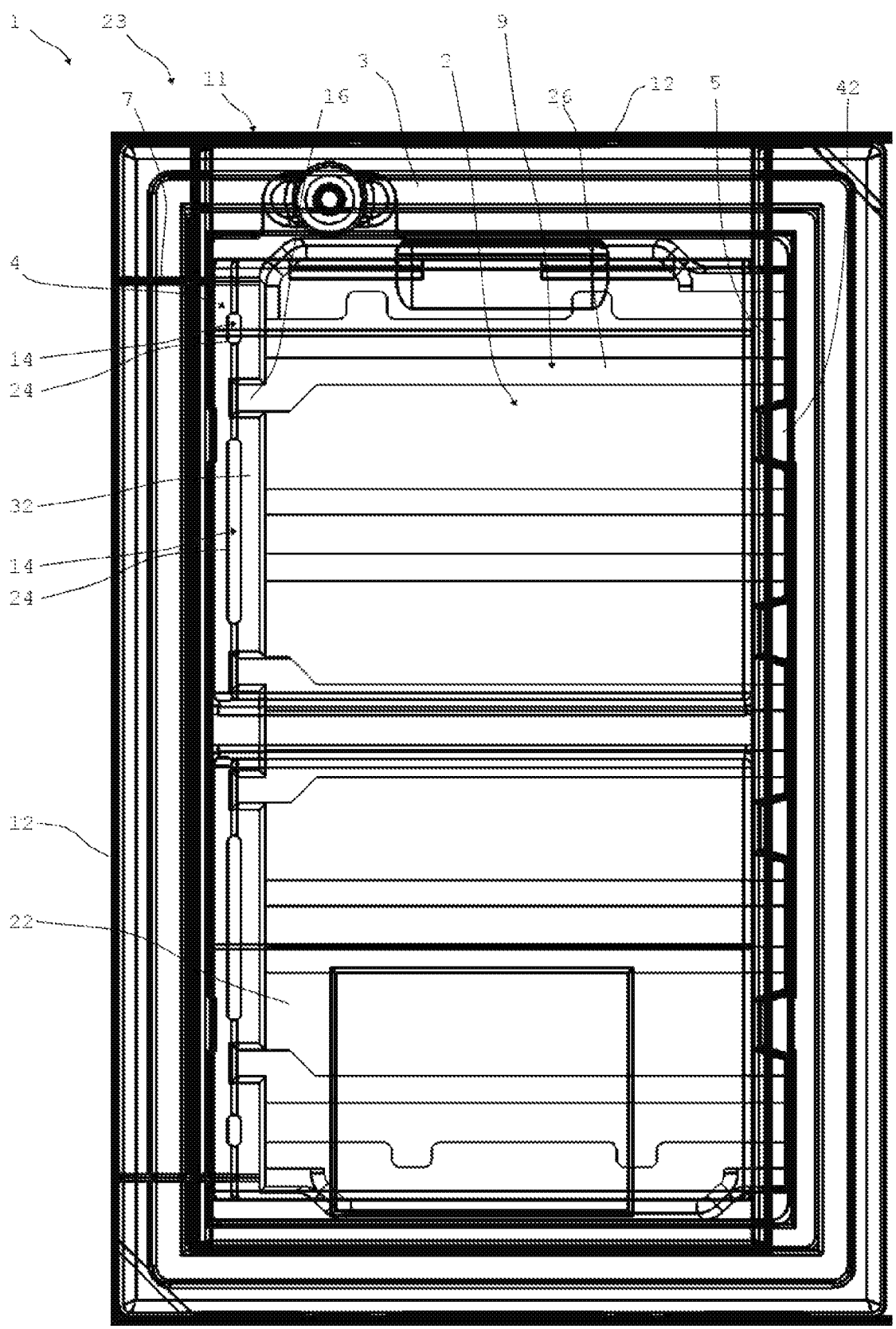
FIG. 8 shows a plan view of a partially transparent depiction of the transport box in a second cover position.

As can be seen in FIGS. 1 and 5, the covers 3 are identified respectively on one side with the inscription "fresh product" and on an opposite side with the inscription "frozen product". Furthermore, under the letterings there are provided two respective block arrows. As can be seen in FIG. 1, the lower part 11 of the transport box 1 is also identified with block arrows. In addition, the letterings are arranged on the cover 3 in such a way, that they describe the cover position 13, 23, when the block arrows of the cover 3 and the lower part 11 are brought into correspondence. Thus, it can be seen in a simple and reliable manner, whether the cover 3 is positioned in the first cover position 13 ("frozen product") or in the second cover position 23 for keeping fresh ("fresh product").

In order to be able to ensure an intactness of the products and prevent a subsequent variation of the cover positions 13, 23, the covers 3 and the lower part 11 are equipped here with a depressed sealing surface 101. In the example shown here, the sealing surfaces 101 of the cover 3 and the lower part 11 complement each other to form a circle, on which, for example a correspondingly circular sealing, can then be affixed. Opening or turning the cover 3 then automatically leads to a damage of the sealing.

LIST OF REFERENCE NUMBERS 1 transport box
2 receiving space
3 cover
4 flow connection
5 inlet groove
6 groove
7 outlet opening
8 lateral wall
11 lower part
12 lateral wall
13 cover position
14 through-opening
22 base
23 cover position
24 elongated hole
32 lateral wall section
33 coolant space
42 wall section
43 recessed grip
53 cover
63 coolant region
101 sealing surface
200 coolant

The invention claimed is:

1. A transport box (1) for partially prepared meals and food, comprising:
 (a) a lower part (11), the lower part comprising:
  at least two receiving spaces (2) delimited by a plurality of outer lateral walls (12);
  at least one common lateral wall (8) separating the receiving spaces;
  at least one base (22); and
  a plurality of vertical inlet grooves (5) formed in vertical sides of the common lateral wall; and
 (b) at least one cover (3), each cover comprising:
  at least one coolant space (63) for receiving a coolant (200), each coolant space having a bottom;
  vertical through openings (14) formed through one side of the bottom of each coolant space, the through openings (14) located in an area of the bottom of each coolant space that either opens or closes a flow connection (4) between the cover (3) and the lower part (11) depending on a position of the cover (3) as assembled to the lower part (11), the cover configured to be positioned in:
   (i) a first cover position (13) in which the through openings (14) overlap the inlet grooves (5) of the lower part (11) such that coolant can flow from the at least one coolant space (63) through the flow connection (4) to a receiving space (2), thereby controlling a temperature of a receiving space associated with a cover in the first cover position to a first temperature, or
   (ii) a second cover position (23) that is rotated 180 degrees from the first cover position (13) as assembled to the lower part (11), in which the through openings (14) do not overlap the inlet grooves (5) of the lower part (11) such that the flow connection (4) is sealed by interference with a portion of the at least one outer lateral wall (12), thereby controlling a temperature of a receiving space (2) associated with a cover (3) in the second cover position (23) to a second temperature that is higher than the first temperature since coolant (200) cannot flow from a coolant space (63) to a receiving space (2) when the cover is in the second cover position.

2. The transport box of claim 1, the lower part (11) further comprising at least two horizontal outlet openings (7) formed in a periphery of each of the receiving spaces (2) for allowing the coolant (200) to escape the receiving spaces, the horizontal outlet openings comprising slot-shaped depressions.

3. The transport box of claim 1, the lower part (11) further comprising a channel unit (9) formed at an upper periphery of the receiving spaces for directing the coolant (200) around the upper periphery of the receiving spaces.

4. The transport box of claim 1, the at least one cover (3) further comprising at least one coolant space cover (53) for covering the at least one coolant space.

5. The transport box of claim 1, the at least one cover (3) further comprising at least one respective recessed grip (43) and the recessed grip comprises a cutout at one corner of the at least one cover.

6. The transport box of claim 1, wherein the transport box (1) is made of expanded polypropylene.

7. The transport box of claim 1, further comprising the coolant, the coolant comprising dry ice in the form of at least one block, at least one disc, or a plurality of pellets.

8. The transport box of claim 1, further comprising at least one deepened or elevated sealing surface (101) for applying a sealing comprising at least one partial section of the lower part (11) and at least one partial section of a cover (3).

9. The transport box of claim 1, the common lateral wall (8) having a thickness more than 70 mm.

10. The transport box of claim 1, each receiving space (2) having a volume between 8 L and 30 L.

11. The transport box of claim 1, the vertical inlet grooves (5) having a width of at least 40 mm and a depth of at least 6 mm.

12. The transport box of claim 1, each coolant space (63) having a reception volume between 4 L and 7 L.

13. A transport box (1) for partially prepared meals and food, comprising:
 (a) a lower part (11), the lower part comprising:
  at least two receiving spaces (2) delimited by a plurality of outer lateral walls (12), at least one common lateral wall (8) separating the receiving spaces, and at least one base (22),
   the common lateral wall having a thickness more than 70 mm,
   each receiving space having a volume between 8 L and 30 L;
  a channel unit (9) formed at an upper periphery of the receiving spaces for directing a coolant (200) around the upper periphery of the receiving spaces, the coolant comprising sublimated dry ice;
  a plurality of vertical inlet grooves (5) formed in vertical sides of the common lateral wall, the inlet grooves having a width of at least 40 mm and a depth of at least 6 mm; and
  at least two horizontal outlet openings (7) formed in a periphery of each of the receiving spaces (2) for allowing coolant to escape the receiving spaces, the horizontal outlet openings comprising slot-shaped depressions; and (b) at least one cover (3), each cover comprising:
  at least one coolant space (63) for receiving dry ice, each coolant space having a reception volume between 4 L and 7 L, each coolant space having a bottom;
  at least one coolant space cover (53) for covering the at least one coolant space;
  vertical through openings (14) formed through one side of the bottom of each coolant space,
    the through openings (14) comprising elongated holes (24),
    the through openings (14) located in an area of the bottom of each coolant that either opens or closes a flow connection (4) between the cover (3) and the lower part (11) depending on a position of the cover (3) assembled to the lower part (11); the cover configured to be positioned in:
    (i) a first cover position (13) in which the elongated holes (24) overlap the inlet grooves (5) of the lower part (11) such coolant can flow from the at least one coolant space (63) through the flow connection (4) to a respective receiving space (4), thereby controlling a temperature of a receiving space associated with a cover in the first cover position to below −12° C., or
    (ii) a second cover position (23) that is rotated 180 degrees from the first cover position when assembled to the lower part (11), in which the elongated holes (24) do not overlap the inlet grooves (5) of the lower part (11) such that the flow connection (4) is sealed by interference with an outer lateral wall (12), thereby controlling the temperature of a receiving space associated with a cover in the second cover position to between 0° C. and 6° C.

14. The transport box of claim 13, the at least one cover (3) further comprising at least one respective recessed grip (43) and the recessed grip comprises a cutout at one corner of the at least one cover.

15. The transport box of claim 13, wherein the transport box (1) is made of expanded polypropylene.

16. The transport box of claim 13, further comprising at least one deepened or elevated sealing surface (101) for applying a sealing comprising at least one partial section of the lower part (11) and at least one partial section of a cover (3).

* * * * *